May 31, 1960
R. F. FRITCH
2,938,744
OIL SEAL
Filed May 9, 1958
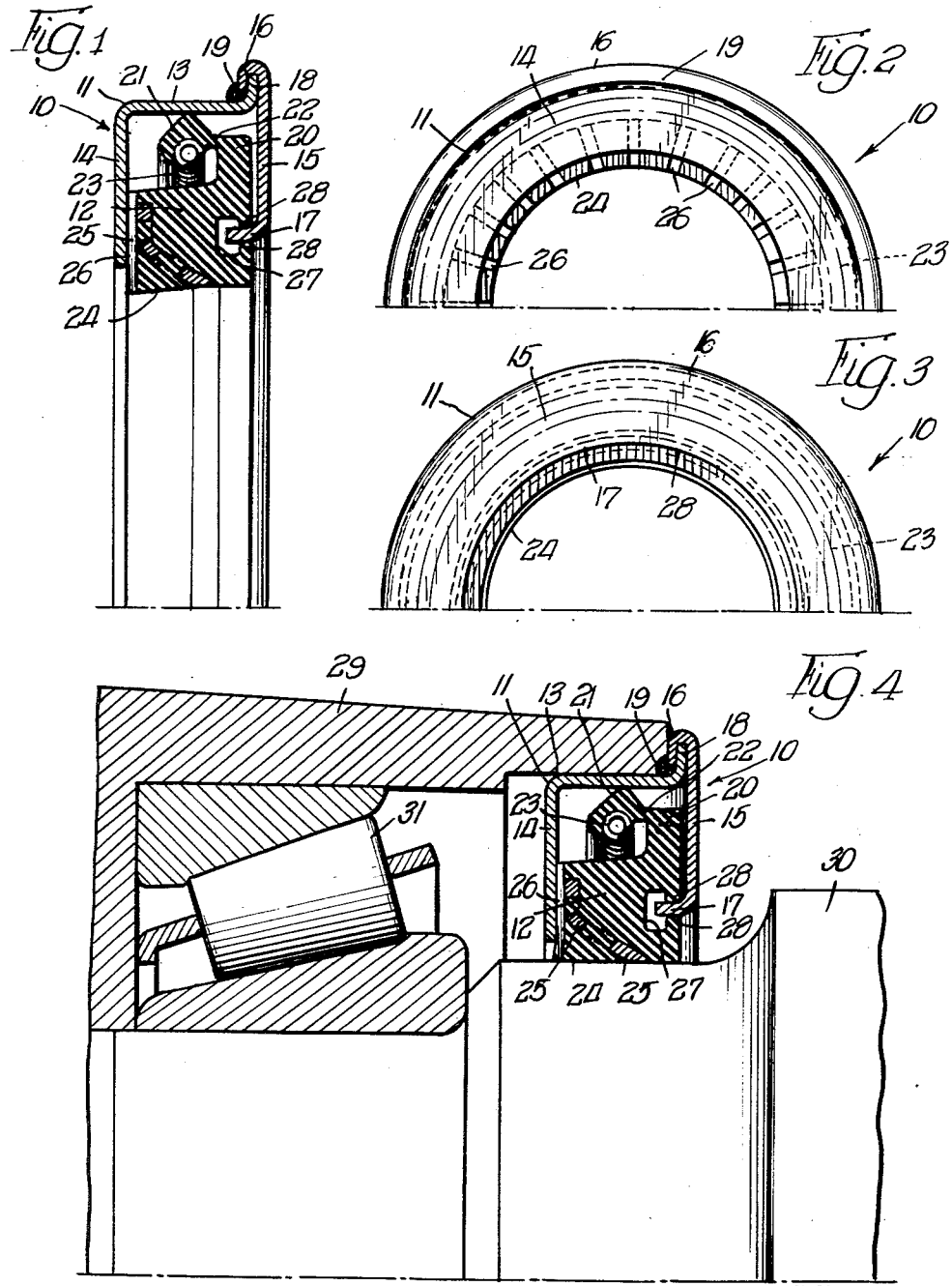
INVENTOR.
Robert F. Fritch
BY
Cromwell, Greist & Warden
Attys United States Patent Office 2,938,744
Patented May 31, 1960

2,938,744

OIL SEAL

Robert F. Fritch, 815 North East Ave., Oak Park, Ill.

Filed May 9, 1958, Ser. No. 734,332

15 Claims. (Cl. 288—3)

The present invention is directed to a new and improved oil seal particularly adapted for mounting about a rotatable shaft to seal the same relative to its housing.

It is an object of the present invention to provide a new and improved form of shaft-type oil seal assembly including a self-contained and self-defined running seal as well as a separate shaft seal, the oil seal assembly being provided with means forming a part thereof permitting lubrication of the self-contained running seal.

A further object is to provide a shaft-type seal assembly of the type described in the foregoing object wherein the assembly further includes dust-guard means for protecting the self-contained running seal forming a part thereof, the assembly consisting essentially of a gasket-type sealing member mounted within a casing and being movable relative thereto without interfering with efficient functioning of the self-contained running seal defined thereby, lubrication thereof, or dust exclusion therefrom.

Other objects not specifically set forth will become apparent from the following detailed description made in conjunction with the drawing wherein:

Fig. 1 is a longitudinal half section of the improved oil seal of the present invention;

Fig. 2 is a partial end face view of the seal on reduced scale as viewed from the left in Fig. 1;

Fig. 3 is a partial opposite end face view of the seal of Fig. 1 as viewed from the right therein; and Fig. 4 is a fragmentary, partly sectioned view of a typical assembly in which the seal of the present invention is operatively mounted.

Figs. 1–3 illustrate the new and improved seal 10 of the present invention as including a generally U-shaped annular casing or housing 11 having received therein an annular sealing member 12 formed from resiliently flexible rubber or rubber-like material. The casing 11 is formed basically from an axially directed wall 13 which joins two axially spaced and radially inwardly directed walls 14 and 15. For ease of manufacture, the walls 13 and 14 are preferably integrally joined and the wall 15 is formed from a metal ring provided along opposite edges thereof with flanges 16 and 17. The free edge of the axially directed wall 13 is provided with a flange 18 which is radially directed away from the sealing member 12. In assembling the casing 11, the flange 16 of the ring 15 is rolled about the flange 18 thus providing a circumferentially continuous, radially projecting rib-like portion from the cooperating flanges 16 and 18. The inner base portion of the combined flanges 16 and 18 in cooperation with the wall 13 has preferably applied thereto a flowed on circumferentially continuous gasket 19.

The sealing member 12, as particularly illustrated in Fig. 1, is of block-like cross section having a relatively thick body portion. A radially outwardly projecting neck 20 of reduced thickness has integrally joined therewith an axially directed and radially outwardly acting flexible sealing lip portion. The sealing lip portion is connected to the neck 20 through a relatively thin flexible web 22 providing for ready flexing of the sealing lip portion which is in internal sealing engagement with the inner surface of the axially directed wall 13 of the casing 11.

The inner surface of the sealing lip portion 21 is grooved and has seated therein a tensioned circumferentially continuous coil spring 23 which urges and holds the sealing lip portion 21 into sealing engagement with the inner surface of the casing 11. The sealing arrangement described constitutes the self-contained sealing action of the assembly with the sealing member 12 being rotatable and radially movable relative to the casing 11. In this respect, the coil spring 23 maintains the sealing lip portion 21 in sealing engagement with the inner surface of the axially directed wall 13 at all time during eccentric movement of the sealing member 12.

The inner periphery of the sealing member 12 is provided with a sealing surface 24 which is tapered radially inwardly in the direction of the wall 14 as particularly illustrated in Fig. 1. The sealing surface 24 is designed for sealing engagement with a shaft or other part of a known type of installation. Imbedded within the body portion of the sealing member 12 is a flexible ring 25 which is provided with a plurality of perforations in which the rubber material of the sealing member is flowed to fixedly locate the ring therewithin. The ring 25 is provided with a radially directed outer portion and an inwardly and axially inclined inner portion which emerges at the inner sealing surface 24. The ring thus tends to interrupt the sealing surface 24 and is designed for engagement with a shaft or other suitable part to assure continued flexible resilient sealing engagement with the part over a long period of operation during which the rubber material defining the sealing surface 24 may become set and thereby relatively ineffective for resilient sealing action.

The radial side surface of the sealing member 12 adjacent the casing wall 14 is in engagement therewith and is provided with a series of radially extending grooves 26 which are circumferentially spaced therealong. The grooves 26 define passages for delivering lubricant into the interior of the casing 11 for lubrication of the sealing lip portion 21 and the inner surface of the axially directed wall 13.

To prevent the entry of foreign material, such as dust, that might adversely affect the sealing action of the sealing lip portion 21, the opposite radial face of the sealing member 12 is provided with a relatively deep, circumferentially continuous recess or pocket 27 which is closed at the outer end thereof by a pair of cooperating flexible lips 28. Received in the recess 27 is the flange 17 of the ring 15 with opposite surfaces of this flange being completely sealed by the resilient lips 28. In this respect, the interior of the casing 11 is completely closed with the exception of the lubricant passages 26 and foreign matter cannot enter into the casing. This is of particular importance in connection with the type of installational use illustrated in Fig. 4.

As shown in Fig. 4, a bearing and shaft housing 29 has received therein a shaft 30 and bearing structure 31. The seal 10 is mounted about the shaft 30 and press fitted into the outer end of the housing 29. The gasket 19 functions to seal the casing 11 in the end of the housing 29 and the radial rib defined by the flanges 16 and 18 provides a positive stop for proper mounting of the seal 10 within the housing 29. This positive stop is further advantageously used for seal removal from the housing as the same may be readily grasped for seal dismounting without distortion of the casing 11 or undesirable damage thereto. The tapered sealing surface 24 rides the shaft 30 and the sealing member 12 may rotate with the shaft relative to the casing 11.

With rotation of the sealing member 12 relative to the casing 11, the sealing lip portion 21 defines a moving seal against the inner surface of the axially directed wall 13 which sealing action is wholly self-contained and fully protected by the dust guard arrangement including the recess 27 and flange 17. In this respect it will be noted that the dust guard arrangement is positioned at the outer end of the housing 29 to seal the interior of the casing 11 while the lubricant flow passages 26 are positioned within the housing 29 and fully protected against delivery thereby of foreign material into the interior of the casing 11.

The sealing surface 24 is tapered as previously described for ease of assembly and the resilient embedded ring 25 has the inner periphery thereof in direct contact with the shaft to provide at all times sealing action with the shaft even after long use of the seal 10 to an extent that the rubber material of the sealing surface 24 has become set and relatively ineffective. The sealing member 12 is free to move eccentrically with the shaft 30 relative to the casing 11 with the radial face of the sealing member carrying the grooves 26 sliding along the inner surface of the side wall 14. The flexible lips 28 permit movement of the sealing member 12 relative to the side wall 15 while remaining in efficient sealing engagement with the flange 17 for the purpose described.

The seal 10 of the present invention is particularly adapted for long life efficient use in truck axle assemblies of the type illustrated in Fig. 4. While only one form of the seal has been illustrated, namely, an external form, an internal type seal incorporating the structural features described falls within the scope of the present invention. In this respect it will be understood that the seal assembly may be completely reversed with the casing 11 being located on the inner periphery of the assembly and the sealing member 12 being formed with the sealing surface 24 defining the outer periphery of the assembly.

Obviously certain modifications and variations of the invention as hereinbefore set forth may be made without departing from the spirit and scope thereof, and therefore only such limitations should be imposed as are indicated in the appended claims.

I claim:

1. An oil seal assembly for mounting between a pair of relatively movable parts, said assembly including a casing receiving therein a sealing member having a flexible sealing lip in sealing engagement with an inner surface portion of said casing, a sealing portion forming a part of said sealing member and extending out of said casing for sealing engagement with one of said parts, said sealing member being sealed relative to said casing along opposite radial surfaces thereof while being movable relative to said casing, and means forming a part of said assembly to provide for lubrication of said flexible sealing lip, said means being radially directed passages formed in said sealing member.

2. An oil seal assembly for mounting between a pair of relatively movable parts, said assembly including a casing receiving therein a sealing member having a flexible sealing lip in sealing engagement with an inner surface portion of said casing, a sealing portion forming a part of said sealing member and extending out of said casing for sealing engagement with one of said parts, said sealing member being sealed relative to said casing along opposite radial surfaces thereof while being movable relative to said casing, and means forming a part of said assembly to provide for lubrication of said flexible sealing lip, said means being radially directed passages formed in said sealing member and extending along a radial face of said sealing member between the same and said casing.

3. An oil seal for mounting between a pair of relatively movable parts, said seal having an annular casing receiving therein an annular sealing member, said sealing member being provided with a pair of sealing surfaces one of which is in flexible sealing engagement with an inner surface of said casing and the other of which is positioned free of said casing for sealing engagement with one of said parts, a radial face of said sealing member being in engagement with an inner radial face of said casing and being provided with at least one radially directed groove therealong to provide for lubrication of the sealing surface within said casing.

4. An oil seal for mounting between a pair of relatively movable parts, said seal having an annular casing receiving therein an annular sealing member, said sealing member being provided with a pair of sealing surfaces one of which is in flexible sealing engagement with an inner surface of said casing and the other of which is positioned free of said casing for sealing engagement with one of said parts, a radial face of said sealing member being in engagement with an inner radial face of said casing and being provided with at least one radially directed groove therealong to provide for lubrication of the sealing surface within said casing, and a radially directed and axially inclined flexible metallic ring embedded in the other of said sealing surfaces for engagement with said one part.

5. An oil seal for mounting between a pair of relatively movable parts, said seal having an annular casing receiving therein an annular sealing member, said sealing member being provided with a pair of sealing surfaces one of which is in flexible sealing engagement with an inner surface of said casing and the other of which is positioned free of said casing for sealing engagement with one of said parts, a first radial face of said sealing member being in engagement with a first radial wall of said casing and being provided with at least one radially directed groove therealong to provide for lubrication of the sealing surface within said casing, a second radial face of said sealing member opposite said first radial face being in sealing engagement with a second radial wall of said casing.

6. An oil seal for mounting between a pair of relatively movable parts, said seal having an annular casing receiving therein an annular sealing member, said sealing member being provided with a pair of sealing surfaces one of which is in flexible sealing engagement with an inner surface of said casing and the other of which is positioned free of said casing for sealing engagement with one of said parts, a first radial face of said sealing member being in engagement with a first radial wall of said casing and being provided with at least one radially directed groove therealong to provide for lubrication of the sealing surface within said casing, a second radial face of said sealing member opposite said first radial face being in sealing engagement with a second radial wall of said casing, said second radial face carrying a circumferentially continuous recess closed along the outer edge thereof by a pair of flexible lips receiving therebetween an axially inwardly projecting edge of said second radial wall.

7. An oil seal for mounting between a pair of relatively movable parts, said seal having an annular casing receiving therein an annular sealing member, said sealing member being provided with a pair of sealing surfaces one of which is in flexible sealing engagement with an inner surface of said casing and the other of which is positioned free of said casing for sealing engagement with one of said parts, a first radial face of said sealing member being in engagement with a first radial wall of said casing and being provided with at least one radially directed groove therealong to provide for lubrication of the sealing surface within said casing, a second radial face of said sealing member opposite said first radial face being in sealing engagement with a second radial wall of said casing, said second radial face carrying a circumferentially continuous recess closed along the outer edge thereof by a pair of flexible lips receiving therebetween an axially inwardly projecting edge of said second radial wall, and a radially directed and axially inclined flexible metallic ring imbedded in the other of said sealing surfaces for engagement with said one part.

8. An oil seal for mounting between a pair of relatively movable parts, said seal including a generally U-shaped housing provided with a pair of axially spaced and radially directed walls joined by an axially directed wall, a resilient sealing member in said housing, said sealing member having a flexible sealing lip portion in engagement with the inner surface of said axially directed wall, said sealing member further being provided with a sealing surface extending out of said housing for engagement with one of said parts, a first radial surface of said sealing member being in engagement with the inner surface of one of said radially directed walls and being provided with at least one radially directed groove therealong to permit the flow of lubricant into said housing for lubrication of said sealing lip portion, and a dust guard sealing arrangement established between a second radial surface of said sealing member and the other of said radially directed walls.

9. An oil seal for mounting between a pair of relatively movable parts, said seal including a generally U-shaped housing provided with a pair of axially spaced and radially directed walls joined by an axially directed wall, a resilient sealing member in said housing, said sealing member having a flexible sealing lip portion in engagement with the inner surface of said axially directed wall, said sealing member further being provided with a tapered sealing surface extending out of said housing for engagement with one of said parts, an inclined metallic ring embedded in said sealing member and interrupting said sealing surface for engagement with said part, a first radial surface of said sealing member being in engagement with the inner surface of one of said radially directed walls and being provided with at least one radially directed groove therealong to permit the flow of lubricant into said housing for lubrication of said sealing lip portion, and a dust guard sealing arrangement established between a second radial surface of said sealing member and the other of said radially directed walls.

10. An oil seal for mounting between a pair of relatively movable parts, said seal including a generally U-shaped housing provided with a pair of axially spaced and radially directed walls joined by an axially directed wall, a resilient sealing member in said housing, said sealing member having a flexible sealing lip portion in engagement with the inner surface of said axially directed wall, said sealing member further being provided with a sealing surface extending out of said housing for engagement with one of said parts, a first radial face of said sealing member being in engagement with the inner surface of one of said radially directed walls and being provided with at least one radially directed groove therealong to permit the flow of lubricant into said housing for lubrication of said sealing lip portion, and a second radial face of said sealing member having a pocket therein the outer extremity of which is defined by a pair of cooperating flexible lips receiving therebetween a portion of the other of said radially directed walls to completely seal off said housing therealong.

11. An oil seal for mounting between a pair of relatively movable parts, said seal including a generally U-shaped housing provided with a pair of axially spaced and radially directed walls joined by an axially directed wall, a resilient sealing member in said housing, said sealing member having a flexible sealing lip portion in engagement with the inner surface of said axially directed wall, said sealing member further being provided with a sealing surface extending out of said housing for engagement with one of said parts, a first radial face of said sealing member being in engagement with the inner surface of one of said radially directed walls and being provided with at least one radially directed groove therealong to permit the flow of lubricant into said housing for lubrication of said sealing lip portion, and a second radial face of said sealing member having a pocket therein the outer extremity of which is defined by a pair of cooperating flexible lips receiving therebetween a portion of the other of said radially directed walls to completely seal off said housing therealong, said one radially directed wall of said housing being integrally formed with said axially directed wall with the free edge of the latter provided with a flange directed radially away from said sealing member, said other radially directed wall being in the form of a ring having edges defined by flanges one of which engages the flange of said axially directed wall to complete said housing and the other of which is received in said pocket.

12. An oil seal for mounting between a pair of relatively movable parts, said seal including a generally U-shaped housing provided with a pair of axially spaced and radially directed walls joined by an axially directed wall, a resilient sealing member in said housing, said sealing member having a flexible sealing lip portion in engagement with the inner surface of said axially directed wall, said sealing member further being provided with a tapered sealing surface extending out of said housing for engagement with one of said parts, an inclined metallic ring embedded in said sealing member and interrupting said sealing surface for engagement with said part, a first radial face of said sealing member being in engagement with the inner surface of one of said radially directed walls and being provided with at least one radially directed groove therealong to permit the flow of lubricant into said housing for lubrication of said sealing lip portion, and a second radial face of said sealing member having a pocket therein the outer extremity of which is defined by a pair of cooperating flexible lips receiving therebetween a portion of the other of said radially directed walls to completely seal off the housing therealong, said one radially directed wall of said housing being integrally formed with said axially directed wall with the free edge of the latter provided with a flange directed radially away from said sealing member, said other radially directed wall being in the form of a ring having edges defined by flanges one of which engages the flange of said axially directed wall to complete said housing and the other of which is received in said pocket.

13. An oil seal for mounting between a pair of relatively movable parts, said seal having an annular casing receiving therein an annular sealing member, said sealing member being provided with a pair of sealing surfaces one of which is in flexible sealing engagement with an inner surface of said casing and the other of which is positioned free of said casing for sealing engagement with one of said parts, a first radial face of said sealing member being in engagement with a first radial wall of said casing, a second radial face of said sealing member opposite said first radial face being in sealing engagement with a second radial wall of said casing, said second radial face carrying a circumferentially continuous recess closed along the outer edge thereof by a pair of flexible lips receiving therebetween an axially inwardly projecting edge of said second radial wall.

14. An oil seal for mounting between a pair of relatively movable parts, said seal including a generally U-shaped housing provided with a pair of axially spaced and radially directed walls joined by an axially directed wall, a resilient sealing member in said housing, said sealing member having a flexible sealing lip portion in engagement with the inner surface of said axially directed wall, said sealing member further being provided with a sealing surface extending out of said housing for engagement with one of said parts, a first radial face of said sealing member being in engagement with the inner surface of one of said radially directed walls, and a second radial face of said sealing member having a pocket therein the outer extremity of which is defined by a pair of cooperating flexible lips receiving therebetween a portion of the other of said radially directed walls to completely seal off said housing therealong.

15. An oil seal for mounting between a pair of relatively movable parts, said seal including a generally U-shaped housing provided with a pair of axially spaced and radially directed walls joined by an axially directed wall, a resilient sealing member in said housing, said sealing member having a flexible sealing lip portion in engagement with the inner surface of said axially directed wall, said sealing member further being provided with a sealing surface extending out of said housing for engagement with one of said parts, a first radial face of said sealing member being in engagement with the inner surface of one of said radially directed walls, and a second radial face of said sealing member having a pocket therein which receives a portion of the other of said radially directed walls to completely seal off said housing therealong.

References Cited in the file of this patent

UNITED STATES PATENTS

| | | |
|---|---|---|
| 2,055,917 | Victor et al. | Sept. 29, 1936 |
| 2,162,104 | Mosher | June 13, 1939 |
| 2,415,888 | Jay | Feb. 18, 1947 |

FOREIGN PATENTS

| | | |
|---|---|---|
| 591,522 | Great Britain | Aug. 20, 1947 |

UNITED STATES PATENT OFFICE

CERTIFICATE OF CORRECTION

Patent No. 2,938,744                           May 31, 1960

Robert F. Fritch

It is hereby certified that error appears in the above numbered patent requiring correction and that the said Letters Patent should read as corrected below.

In the grant, lines 1, 2 and 3, for "Robert F. Fritch, of Oak Park, Illinois," read -- Robert F. Fritch, of Oak Park, Illinois, assignor to Chicago Rawhide Manufacturing Company, Inc., of Chicago, Illinois, a corporation of Illinois,"; line 12, for "Robert F. Fritch, his heirs" read -- Chicago Rawhide Manufacturing Company, Inc., its successors --; in the heading to the printed specification, line 3, for "Robert F. Fritch, 815 North East Ave., Oak Park, Ill." read -- Robert F. Fritch, Oak Park, Ill., assignor to Chicago Rawhide Manufacturing Company, Inc., Chicago, Ill., a corporation of Illinois --.

Signed and sealed this 10th day of January 1961.

(SEAL)
Attest:

KARL H. AXLINE                               ROBERT C. WATSON
Attesting Officer                       Commissioner of Patents